March 31, 1936. L. A. PARKER Re. 19,910

CIRCULATING HEAD

Original Filed March 16, 1928 2 Sheets-Sheet 1

INVENTOR.
LLOYD A. PARKER.
BY H. A. Dreshman
ATTORNEY

March 31, 1936. L. A. PARKER Re. 19,910

CIRCULATING HEAD

Original Filed March 16, 1928 2 Sheets-Sheet 2

INVENTOR.
LLOYD A. PARKER.
BY.
H. A. Duckman
ATTORNEY

Reissued Mar. 31, 1936

Re. 19,910

UNITED STATES PATENT OFFICE 19,910

CIRCULATING HEAD

Lloyd A. Parker, Long Beach, Calif., assignor to John Grant, Los Angeles, Calif.

Original No. 1,827,257, dated October 13, 1931, Serial No. 262,209, March 16, 1928. Application for reissue February 25, 1933, Serial No. 658,632

22 Claims. (Cl. 285—161)

This invention has reference to circulating and cementing heads for use on well pipe or casing, such devices being characterized as comprising a capped body adapted to be secured to the upper end of the well casing, and having an inlet or opening through which circulating fluid or cement is pumped into the well. The invention is concerned primarily with means whereby circulating or cementing heads may be detachably secured to the well pipe in a manner such as to greatly facilitate their use, and to greatly expedite well cementing and circulating fluid pumping operations.

Whether the casing head be used in the operation of "circulating" or cementing the well, it is desirable that the head be capable of quick and secure attachment to the casing and of quick detachment therefrom. It not only is generally desirable that the head have these characteristics from standpoints of time and labor saving, but in cementing operations it often becomes essential that the time required for attaching and detaching the cementing head be reduced to a minimum.

According to the general procedure followed in cementing wells, mud ladened fluid first is pumped into the well through the casing and allowed to circulate upward and around the casing to the ground level, the fluid clearing out the strata around the casing to provide space for the cement. After establishing satisfactory circulation in this manner, the circulation is stopped and cement pumped into the well through the casing, either on top the circulating fluid or on top a swab or scantling above the circulating fluid. Generally a measured quantity of cement is pumped into the well, followed by additional circulating fluid, the cement being discharged out of the lower end of the casing and thence forced upwardly around the casing a distance in accordance with the amount of cement put into the well. In order that it may be determined when all, or substantially all of the cement has been discharged from the casing into the well, a plug is placed in the casing on top the cement, the circulating fluid pumped in on top the plug, and the latter then forced downward until it is arrested by a stop at the lower end of the casing, arresting of the plug being indicated by increased pressure of the pump circulating fluid.

Frequently the initial "circulation" of the well is carried out using one type of circulating head, and thereafter the head may be removed either for the purpose of entering a plug in the casing, or possibly for replacing the circulating head with a special cementing head or attachment. In order that these changes may be made while the well is in condition for cementing immediately following circulation, it is necessary that the circulating and cementing heads be capable of quick attachment and removal. In the event the cementing head is not designed to carry a plug, the head is removed from the casing after the cement charge has been pumped thereinto, a plug inserted in the casing and the head again attached for pumping circulating fluid on top the plug. Since quick setting cement often is used, it becomes essential that the last described operations be carried out quickly to preclude any possibility of the cement setting appreciably within the casing before it is forced out into the well.

The more common ways for attaching circulating and cementing heads to the casing have included threaded joints, clamps attached to the head and engaging the casing, or the lower shoulder of the collar on the casing, and various comparatively complex arrangements for anchoring the head to the casing or the derrick floor. Such means require considerable time for adjustment, and especially those designed to hold the head on the casing with such security as to withstand high pressures. By the invention I have provided a head that, although capable of being quickly and easily attached to the casing, grips the pipe with such security as to withstand the highest pressures. The present type of head may be characterized generally as comprising a body adapted to be placed over the upper end of the casing, pipe gripping elements mounted on the body and adapted to engage the outside of the pipe, and means carried on the body for releasing the gripping elements from the pipe. The body also carries a pressure actuated packing ring whereby the escape of well fluid between the body of the head and the pipe is effectively prevented, this feature being of particular importance in that for the head to serve satisfactorily under pressure, it must not only be attached securely to the casing but also sealed against fluid leakage from the casing.

The pipe gripping elements preferably comprise a plurality of balls carried in a ball seat or wedge ring having inclined wedge faces backing the balls. The balls are capable of a certain amount of vertical movement in the wedge ring, and when the head is lowered over the pipe, the balls are held in raised pipe releasing positions to permit the head to take the pipe. Thereafter, the balls are released to drop into pipe engaging positions and upon slight movement of the head, the balls become wedged between the casing and the wedge ring, thereby securely holding the head in place. To release the balls from engagement with the pipe, a vertically movable releasing ring, mounted in the body beneath the balls is raised to engage and lift the balls into pipe releasing position. The packing ring is clamped in the body above the wedge balls by the ball carrying or wedge ring, and the shape and mounting of the packing ring is such that the fluid pressure within the casing acts upon the packing ring to force it into tight engagement with the casing.

Having set forth generally certain features and objects of the invention, I will now proceed to a detailed description of a typical and preferred embodiment thereof, reference being had throughout the description to the accompanying drawings, in which.

Figure 1:
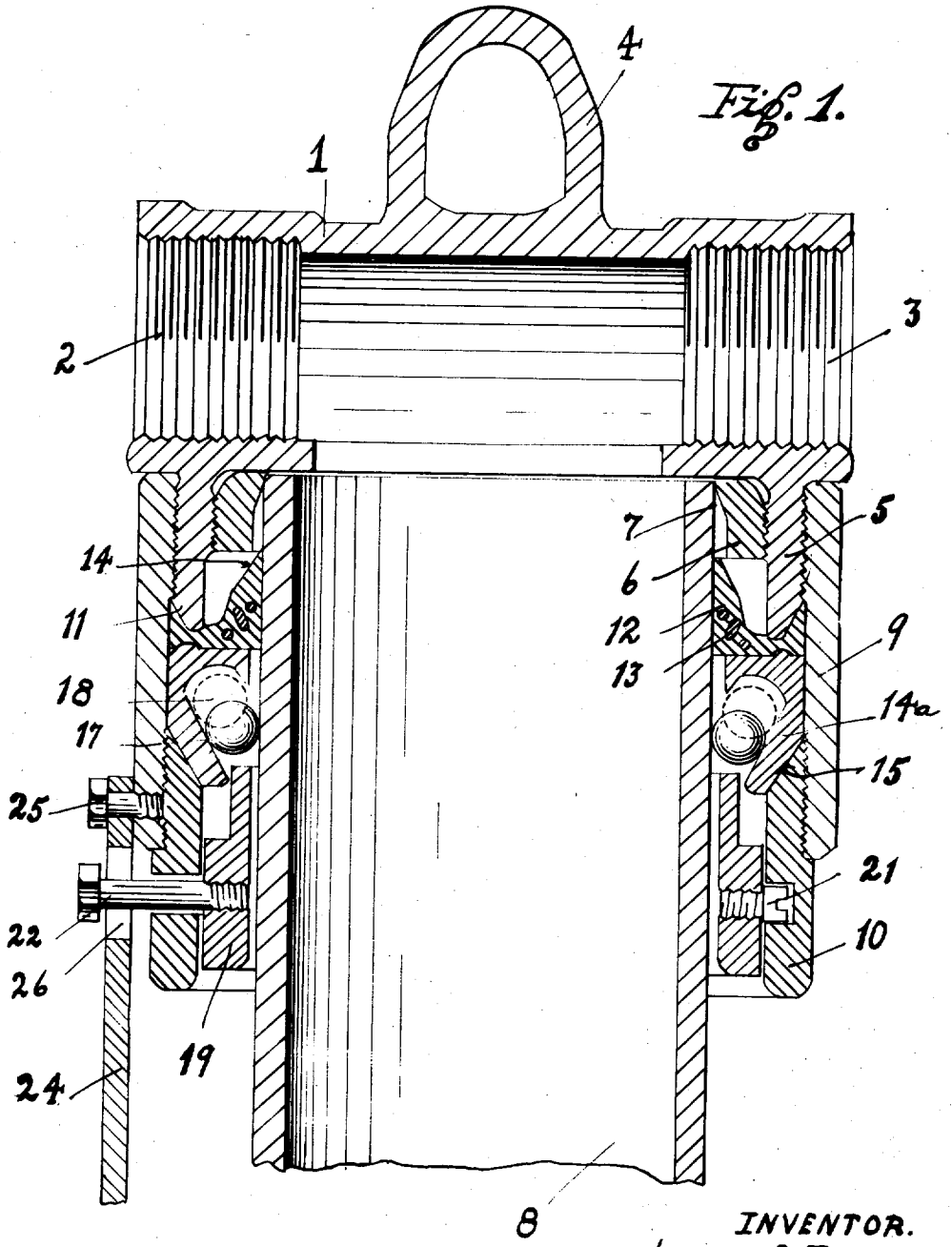
Fig. 1 is a longitudinal medial view of the head in position on the casing.
Figure 2:
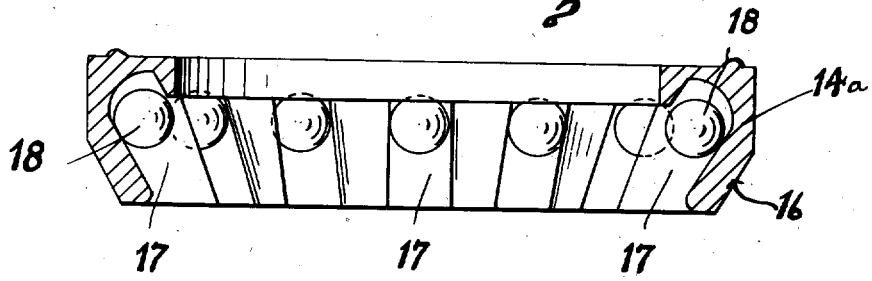
Fig. 2 is a longitudinal sectional view of the wedge ring, the balls however being shown in raised positions.

The body of the head shown in Figure 1 may be considered as comprising a typical upper cap portion 1, having an integral depending skirt 5, a collar 9 threaded on the skirt, and a supporting ring 10 threaded in the lower interior of the collar. The cap portion of the head may be provided with threaded inlets 2 and 3 through which circulating fluid or cement may be pumped into the casing 8, and with an integral eyelet ring 4 by means of which connection is made to the head for attaching or removing it from the casing. A centering ring 6 is threaded into the upper interior of the skirt 5, the centering ring having an inner and upwardly tapered face 7 for engaging the upper end of the casing, and the effect of the tapered face being, when brought into engagement with the casing, to cause the head to be positioned symmetrically relative to the casing. It may be mentioned that the skirt portion 5 and the collar 9 need not necessarily be separate parts, and that the collar and supporting ring 10 may be formed separately. Also it is apparent that the centering ring 6 might comprise an integral portion of the cap or skirt 5 and the latter be machined interiorly to provide the inclined surface 7. However, for purposes of manufacture and in order to facilitate assembling and disassembling the head, it is preferred that the parts be formed separately in the manner illustrated.

A ball holding or wedge ring 14*a* is fitted within the collar, the wedge ring having a lower tapered face 16 seated on a correspondingly inclined face 15 on the upper end of the supporting ring 10. The wedge ring is shaped to provide a plurality of radial inclined grooves 17, each of the grooves carrying a wedge ball 18. The balls are capable of vertical movement within the inclined slots, and in their upper positions clear the casing; whereas in their lower positions they are adapted to be brought into wedging engagement between the casing and the inclined bottom faces of the grooves.

The lower end of the skirt 5 is tapered inwardly at 11 to provide a retaining seat for the flexible packing ring 12 which is confined between the skirt and the wedge ring 14*a*. The packing ring may contain a suitable re-enforcing such as wire 13, if it is desired, and is shaped to provide an upstanding lip 14 adapted to engage the casing. It will be noted that there is a certain amount of clearance between the skirt 5 and the packing ring and between the centering ring 6 and the casing, through which fluid pressure from within the casing may be communicated to the outer surface of the packing ring lip, thereby causing the lip to be forced into tight engagement with the casing, and in a manner such as to preclude the possibility of fluid leakage between the circulating head and the casing. In assembling the head, the supporting ring 10 is screwed into the collar 9 with sufficient tightness to securely clamp the packing ring between the depending skirt and the wedge ring 14*a*.

Figure 3:
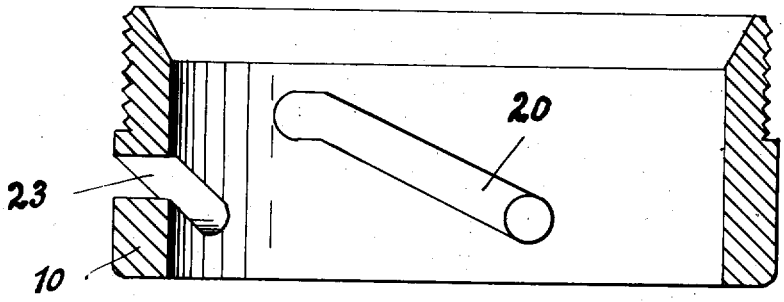
Fig. 3 is a longitudinal sectional view of the slotted apron ring.

Within the supporting ring 10 is mounted a wedge releasing ring 19, the latter carrying a plurality of screws 21, the heads of which protrude within inclined slots 20 formed in the inner face of the supporting ring. The actuating means for the ball releasing ring comprises a lever handle 24 pivotally mounted at 25 on the collar and slotted intermediately as at 26. A bolt 22, threaded into the ring 19, extends through slot 26 and through an inclined slot 23 in the supporting ring, the shape and extent of slot 23 corresponding to that of the previously described slots 20. The releasing ring 19 serves to lower the wedge balls from raised position into a position of engagement with the casing, or to release the balls from such wedging engagement by returning them to their upper positions in the slots. Assuming the balls to be in the solid line positions in Figure 1 and the ring 19 to be in its lower position indicated, upon swinging lever 24, the releasing ring is caused simultaneously to rotate and to rise by virtue of the engagement of screws 21 and bolt 22 in the inclined supporting ring slots. The upper end of the releasing ring is thus brought into lifting engagement with the balls, and the upward movement of the ring may be continued until the balls become elevated to the uppermost interior of the slots 17. And it will be noted in Figure 3 that the slots continue horizontally at their upper end sufficiently to permit the screw heads to perch in said horizontal portions to prevent the lifting ring dropping from its raised position. Likewise, in this position of the ring, its upper end portion encloses the ends of grooves 17 sufficiently to prevent the balls dropping out of the head.

In the operation of attaching the circulating head to the casing, ring 19 first is moved to its upper position so as to confine the balls in the wedge ring, and the head then lowered into position on the casing. Thereafter the wedge ring is lowered thus permitting the balls to drop to the solid line positions shown in Figure 1 into engagement with the casing. Upon subsequent upward movement of the head, whether the head be mechanically raised or forced upward by the pressure within the casing, the balls are brought into tight wedging engagement between the casing and the inclined groove seats. It may be stated that the greater the force tending to lift the head from the casing, the greater will be the wedging effect of the balls, since upon upward movement of the head, the tendency is for the balls to roll relatively further down the inclined groove faces and to become wedged correspondingly tighter between the inclined faces and the casing. Thus it is assured that for extremely high pressures within the casing, the head will be secured retained thereon, and as hereinabove mentioned, by virtue of the pressure actuated packing ring 12, the connection between the head and casing is effectively sealed. And the greater the pressure within the casing the greater will be the sealing effect of the packing ring.

To release the head from the casing, ring 19 is raised in the described manner, the balls being lifted to their releasing positions and held in the upper ends of the inclined slots by virtue of the lifting ring being retained in elevated position when the screw heads are moved into the horizontal upper end portions of the inclined slots. It will be noted that in the procedure of applying or removing the head from the casing, the only operation which it is necessary to perform is that of moving the ring 19, either to cause the balls to engage or disengage the casing, these operations obviously requiring but a few seconds. Another feature having to do with the facility and convenience with which the head may be attached to the casing, resides in the fact that the attachment may be made to a smooth outer pipe surface, as distinguished from common types of heads which depend for their connection upon engaging the lower shoulder of a collar on the upper end of the casing. And in general the advantage of the present type of circulating head will be seen to reside essentially in its simplicity and economy of construction and the facility and security with which it may be attached to the casing.

Having described my invention, I claim:

1. In a circulating head adapted to be mounted on casing and the like, having intake ports therein, a plurality of balls mounted in the head adapted to engage the casing to prevent the removal of the head means providing inclined wedge seats for said balls, and means adapted to engage the balls to lift the same out of engagement with the casing, and fluid pressure actuated packing means in the head adapted to engage the outer surface of the casing.

2. In a circulating head adapted to be positioned on casing and the like, a centering ring in the head adapted to rest on the top of the casing, a packing ring, a lip on the packing ring adapted to be pressed against the casing by fluid pressure, a wedge ring having slots therein, balls in the slots, a control ring adapted to lift the balls, said slots being so inclined that the balls therein are wedged between the ball ring and the casing.

3. In a circulating head adapted to be positioned on casing and the like, a centering ring in the head adapted to rest on the top of the casing, a packing ring, a lip on the packing ring adapted to be pressed against the casing by fluid pressure, a wedge ring having slots therein, balls in the slots, a control ring adapted to lift the balls, said slots being so inclined that the balls therein are wedged between the ball ring and the casing, said head having inclined slots therein, bolts extending from the control ring through said slots and a control lever engaging one of the bolts whereby the control ring is lifted to engage the balls.

4. In a circulating head adapted to be mounted on casing and the like, including a cap having intake ports therein, a depending threaded skirt on the cap, a collar screwed onto the outside of said skirt, a centering ring inside the skirt a packing ring seated against the bottom of the skirt, said packing ring being adapted to press against the exterior surface of the casing, a wedge ring, said wedge ring bearing against the bottom of the packing ring, said wedge ring having inclined slots therein, balls in the slots, said balls being adapted to wedge between the ring and the casing to hold the head in position, an apron screwed into the collar, said apron bearing against the wedge ring to hold it in position, and means adapted to engage the balls to lift them out of engagement with the casing.

5. In a circulating head adapted to be mounted on casing and the like, including a cap having intake ports therein, a depending threaded skirt on the cap, a collar screwed onto the outside of said skirt, a centering ring inside the skirt, a packing ring seated against the bottom of the skirt, said packing ring being adapted to press against the exterior surface of the casing, a wedge ring bearing against the bottom of the packing ring, said wedge ring having inclined slots therein, balls in the slots, said balls being adapted to wedge between the ring and the casing, to hold the head in position, an apron screwed into the collar, said apron bearing against the wedge ring to hold it in position, a control ring inside of the depending apron, screws extending from the control ring, said apron having inclined slots therein into which the screws extend, and manually actuated means engaging the control ring whereby said ring is lifted to engage the balls.

6. In a circulating head adapted to be mounted on casing and the like, including a cap having intake ports therein, a depending threaded skirt on the cap, a collar screwed onto the outside of said skirt, a centering ring inside the skirt, a packing ring seated against the bottom of the skirt, said packing ring being adapted to press against the exterior surface of the casing, a wedge ring bearing against the bottom of the packing ring, said wedge ring having inclined slots therein, balls in the slots, said balls being adapted to wedge between the ring and the casing, to hold the head in position, an apron screwed into the collar, said apron bearing against the wedge ring to hold it in position, a control ring inside of the depending apron, screws extending from the control ring, said apron having inclined slots therein, into which the screws extend, a bolt extending from the control ring through one of said slots, a lever pivoted to the head, said lever having a slot therein, through which the bolt extends, whereby the control ring is raised or lowered as the lever is swung to engage or disengage with the bolts.

7. A circulating head for wells, comprising a capped body having a circulation opening and adapted to be placed over and around the upper end of a well pipe, wedge members mounted on the body and adapted to grip the outside of the pipe upon relative upward movement of the body and to limit such upward movement, packing means within said body and adapted to engage the pipe, means for supporting said packing means from beneath independently of said wedge members, and means mounted on the body and operable to release said wedge members from gripping engagement with the pipe.

8. A circulating head for wells, comprising a capped body having a circulation opening and adapted to be placed over and around the upper end of a well pipe, wedge members mounted on the body and adapted to grip the outside of the pipe upon relative upward movement of the body and to limit such upward movement, fluid pressure actuated packing means within said body and adapted to engage the pipe, means for supporting said packing means from beneath independently of said wedge members, and means mounted on the body and operable to release said wedge members from gripping engagement with the pipe.

9. A circulating head for wells, comprising a capped body having a circulation opening and adapted to be placed over and around the upper end of a well pipe, wedge members mounted on the body and adapted to grip the outside of the pipe upon relative upward movement of the body and to limit such upward movement, fluid pressure actuated packing means within said body and adapted to engage the pipe around its outside, means for supporting said packing means from beneath independently of said wedge members, and means mounted on the body and operable to release said wedge members from gripping engagement with the pipe.

10. A circulating head for wells, comprising a body having its upper end capped and provided with a port for circulation, and having a depending skirt adapted to be placed over and around the upper end of a well pipe, a wedge ring within the skirt and adapted to surround the pipe, wedge members coacting with the wedge ring to wedge and grip the pipe on relative upward movement of the head, a packing ring within the skirt and adapted to engage the pipe, and means within the skirt and operable to lift the wedge members to release them from the pipe.

11. A circulating head for wells, comprising a body having its upper end capped and provided with a port for circulation and having a depending skirt adapted to be placed over and around the upper end of a well pipe, a wedge ring within the skirt and adapted to surround the pipe, wedge members coacting with the wedge ring to wedge and grip the pipe on relative upward movement of the head, a packing ring within the skirt and adapted to engage the pipe around its outside, and means within the skirt and operable to lift the wedge members to release them from the pipe.

12. A circulating head for wells, comprising a body having its upper end capped and provided with a port for circulation, and having a depending skirt adapted to be placed over and around the upper end of a well pipe, a wedge ring within the skirt and adapted to surround the pipe, wedge members coacting with the wedge ring to wedge and grip the pipe on relative upward movement of the head, a packing ring within the skirt and adapted to engage the pipe, said packing ring being held in place by the wedge ring, and means within the skirt and operable to lift the wedge members to release them from the pipe.

13. A circulating head for wells, comprising a body having its upper end capped and provided with a port for circulation, and having a depending skirt adapted to be placed over and around the upper end of a well pipe, a removable ring in the lower end of said skirt, a wedge ring within the skirt and adapted to surround the pipe, the wedge ring being retained in the skirt by said removable ring, wedge members coacting with the wedge ring to wedge and grip the pipe on relative upward movement of the head, a packing ring within the skirt and adapted to engage the pipe, said packing ring being held in place by the wedge ring, and means operable to release the wedge members from gripping engagement with the pipe.

14. A circulating head for wells, comprising a body having its upper end capped and provided with a port for circulation, and having a depending skirt adapted to be placed over and around the upper end of a well pipe, a wedge ring within the skirt and adapted to surround the pipe, wedge members coacting with the wedge ring to wedge and grip the pipe on relative upward movement of the head, a packing ring within the skirt and adapted to engage the pipe, a vertically movable lifting ring within the skirt and operable to lift the wedge members to release them from the pipe, and means for operating the lifting ring.

15. A circulating head for wells, comprising a body having its upper end capped and provided with a port for circulation, and having a depending skirt adapted to be placed over and around the upper end of a well pipe, a wedge ring within the skirt and adapted to surround the pipe, wedge members coacting with the wedge ring to wedge and grip the pipe on relative upward movement of the head, a packing ring within the skirt and adapted to engage the pipe around its outside, a vertically movable lifting ring within the skirt and operable to lift the wedge members to release them from the pipe, and means for operating the lifting ring.

16. A circulating head for wells, comprising a body having its upper end capped and provided with a port for circulation, and having a depending skirt adapted to be placed over and around the upper end of a well pipe, a wedge ring within the skirt and adapted to surround the pipe, wedge members coacting with the wedge ring to wedge and grip the pipe on relative upward movement of the head, a packing ring within the skirt and adapted to engage the pipe, a vertically movable and rotatable lifting ring mounted in inclined cam grooves within the skirt, said lifting ring being adapted to lift said wedge members to release them from the pipe when the ring is rotated.

17. A circulating head for wells, comprising a capped body having a depending skirt and adapted to be placed over and around the upper end of a well pipe, pipe gripping means mounted on the body comprising wedge members adapted to engage and grip the outside of the pipe to prevent relative upward movement of the circulation head, packing means within said body above said pipe gripping means, said packing means comprising a flexible ring having an upwardly projecting annular lip adapted to be forced by fluid pressure into fluid tight engagement with the well pipe, means supporting said ring out of engagement with the wedge members, and means mounted on the body and operable to release said gripping means from the pipe.

18. A circulating head for wells, comprising a body having its upper end capped and provided with a port for circulation, and having a depending skirt adapted to be placed over and around the upper end of a well pipe, a wedge ring within the skirt and adapted to surround the pipe, wedge members coacting with the wedge ring to wedge and grip the pipe on relative upward movement of the head, a packing ring within the skirt above said wedge ring and adapted to engage the pipe around its outside, and means within the skirt and operable to lift the wedge members to release them from the pipe.

19. A well head comprising a capped body adapted to be placed over and around the upper end of a well pipe, wedge members mounted within the body and adapted to grip the outside of the pipe upon relative upward movement of the body, wedge seats for said members, packing means carried within the body and engaging said pipe, and means supporting said packing means from beneath, independently of said wedge members.

20. A well head comprising a capped body adapted to be placed over and around the upper end of a well pipe, wedge members mounted within the body and adapted to grip the outside of the pipe upon relative upward movement of the body, wedge seats for said members, a packing ring carried within the body and having an upwardly projecting lip adjacent the outside of said pipe, said lip being adapted to be forced into tight engagement with the pipe by fluid pressure from the interior of the pipe directed longitudinally along the outside thereof, and means supporting said packing means from beneath independently of said wedge members.

21. A well head comprising a bell structure adapted to fit with annular clearance over the upper open end of a well pipe, a pressure actuated packing secured in the bell and adapted to be pressed against the outside of the pipe by pressure within the bell above the packing, wedging pipe grippers mounted in the bell and acting to grip the pipe by downward and inward wedging movement relative to the bell, whereby upward movement of the bell under interior pressure will tend to tighten the grippers on the pipe, and means to release the grippers by moving them upwardly with relation to the bell.

22. A well head comprising a structure adapted to fit the upper open end of a well pipe with annular clearance, a pressure actuated packing secured to the head structure and adapted to be pressed against the pipe by the pressure within the pipe that tends to move the head structure upwardly, wedging pipe grippers mounted on the head structure and acting to wedge and grip the pipe by reason of downward movement relative to the head structure, whereby upward movement of the structure under pressure tends to tighten the grippers on the pipe, and means to release the grippers by moving them upwardly with relation to the head structure.

LLOYD A. PARKER.